(12) United States Patent
Godfrey et al.

(10) Patent No.: US 10,151,626 B2
(45) Date of Patent: Dec. 11, 2018

(54) FIBRE OPTIC DISTRIBUTED SENSING (71) Applicant: OPTASENSE HOLDINGS LIMITED, Farnborough, Hampshire (GB)

(72) Inventors: Alastair Godfrey, Farnborough (GB); Roger Ian Crickmore, Farnborough (GB)

(73) Assignee: Optasense Holdings Limited (GB)

( * ) Notice: Subject to any disclaimer, the term of this patent is extended or adjusted under 35 U.S.C. 154(b) by 153 days.

(21) Appl. No.: 14/898,031

(22) PCT Filed: Jun. 27, 2014

(86) PCT No.: PCT/GB2014/051963
§ 371 (c)(1),
(2) Date: Dec. 11, 2015

(87) PCT Pub. No.: WO2014/207477
PCT Pub. Date: Dec. 31, 2014

(65) Prior Publication Data
US 2016/0123798 A1    May 5, 2016

(30) Foreign Application Priority Data

Jun. 28, 2013 (GB) .................................. 1311656.1

(51) Int. Cl.
*G01H 9/00* (2006.01)
*G01D 5/353* (2006.01)
(52) U.S. Cl.
CPC ......... *G01H 9/004* (2013.01); *G01D 5/35361* (2013.01)

(58) Field of Classification Search
CPC ........................... G01H 9/004; G01D 5/35361
(Continued)

(56) References Cited

U.S. PATENT DOCUMENTS

2010/0038079 A1   2/2010 Greenaway
2011/0069302 A1*  3/2011 Hill ........................ G01V 1/186
                                                            356/73.1
(Continued)

FOREIGN PATENT DOCUMENTS

GB    2186360          8/1987
GB    2442745 A  *    4/2008  ........... H04B 10/071
(Continued)

*Primary Examiner* — Dominic J Bologna
(74) *Attorney, Agent, or Firm* — McDonnell Boehnen Hulbert & Berghoff LLP (57) ABSTRACT This application describes method and apparatus for fiber optic distributed acoustic sensing (DAS) that allow for quantitative estimation of relatively large and continuous stimuli acting on the sensing fiber. An optical fiber (101) is interrogated with optical pulse and the Rayleigh backscatter detected to provide a DAS sensor. The method involves identifying a first stimulus acting on at least one sensing portion of the optical fiber, which results in an effective optical path length change within said sensing portion of at least the wavelength of the optical radiation. Such a path length change will result in signal wrapping leading to an observed variation (401) in backscatter intensity. The frequency of variation is detected and can be used to estimate the rate of change of path length. The method can be used to estimate strain rate and/or rate of change of temperature.

21 Claims, 4 Drawing Sheets (58) Field of Classification Search
USPC .......................................................... 356/73.1
See application file for complete search history.

(56) References Cited

U.S. PATENT DOCUMENTS

| | | | |
|---|---|---|---|
| 2011/0088462 A1* | 4/2011 | Samson | .................. E21B 47/10 |
| | | | 73/152.18 |
| 2011/0139538 A1* | 6/2011 | Hill | ........................... F17D 5/06 |
| | | | 181/123 |
| 2012/0137781 A1 | 6/2012 | Hill et al. | |
| 2012/0278043 A1* | 11/2012 | Lewis | ...................... G01D 1/00 |
| | | | 702/189 |
| 2012/0280117 A1* | 11/2012 | Lewis | ...................... G01D 1/00 |
| | | | 250/227.17 |

FOREIGN PATENT DOCUMENTS

| WO | WO 2012/117223 | 9/2012 |
|---|---|---|
| WO | WO 2012/123760 | 9/2012 |
| WO | WO 2013/093460 | 6/2013 |

* cited by examiner

FIBRE OPTIC DISTRIBUTED SENSING

FIELD OF THE INVENTION

This application relates to fibre optic distributed sensing, and especially to methods and apparatus for determining quantitative information about environmental stimuli acting on the sensing fibre.

BACKGROUND OF THE INVENTION

Fibre optic distributed acoustic sensing (DAS) is a known technique where an optical fibre, deployed as a sensing fibre, is interrogated with interrogating radiation and radiation which emerges from the fibre is detected and analysed to determine environmental changes acting on the optical fibre. Some fibre optic sensors rely on deliberately introduced features within the fibre, e.g. fibre Bragg gratings or the like, to induce reflection from a point in the fibre. In a fibre optic distributed sensor however the radiation which is backscattered from inherent scattering sites within the fibre is detected. The sensing function is thus distributed throughout the fibre and the spatial resolution and arrangement of the various sensing portions depends on the characteristics of the interrogating radiation and the processing applied.

Various types of DAS sensor have been demonstrated including sensors based on Rayleigh scattering of light from the sensing fibre. Light transmitted into an optical fibre will be scattered from the various inherent scattering sites within an optical fibre. A mechanical vibration of the fibre, such as caused by an incident acoustic wave, will alter the distribution of scattering sites resulting in a detectable change in the properties of the Raleigh backscattered light. Analysing such changes allows relatively high frequency vibrations/acoustic stimuli acting on sensing portions of the optical fibre to be detected.

One type of DAS sensor performs repeated interrogations of the sensing fibre. Each interrogation involves transmitting at least one pulse of coherent optical radiation into the optical fibre and detecting the intensity of backscattered light from each of a number of sensing portions of the sensing fibre, also called channels of the DAS sensor. The intensity of backscatter from a given channel in response to separate interrogations of the sensing fibre is monitored to determine any acoustic stimulus acting on the fibre. In the absence of any environmental stimulus the backscatter intensity from any given sensing portion should remain the same for each repeated interrogation (provided the characteristics of the interrogating pulse(s) remains the same). However an environmental stimulus acting on the relevant sensing portion of the fibre will result in an optical path length change for that section of fibre, e.g. through stretching of the relevant section of fibre and/or a refractive index modulation. As the backscatter from the various scattering sites within the sensing portion of fibre will interfere to produce the resulting intensity, a change in optical path length will vary the degree of interference and thus result in a change in backscatter intensity. This change in intensity can be detected and used as an indication of a disturbances acting on the fibre, such as an incident acoustic wave.

Such DAS sensors, in which the measurement signal is based on intensity variations in the detected backscatter, have been advantageously employed in a wide range of applications. One issue with such sensors however is that relative intensity change in response to a given input stimulus will vary from channel to channel and can also vary for a given channel over time. In other words the gain of the channels is variable. This means that it can be difficult to determine quantitative information about the stimulus from such a sensor. Also typically such sensors typically do not provide any reliable detection of low frequency disturbances on the optical fibre.

One way of providing more quantitative information is to use interrogating radiation which consists of two pulses with each pulse being at a different frequency. This means that the backscatter received at the detector comprises backscatter from both pulses, which will interfere, and thus there will be a signal component at the frequency difference between the pulses. If the two pulses are spatially separated in the fibre then any environmental disturbance acting on the fibre between the pulses that leads to an optical path length change will result in a phase change in the signal at this frequency difference, which can be thought of as a signal at a carrier frequency. By an appropriate choice of carrier frequency this phase change can be detected and the amount of phase change can be related to the amplitude of the disturbance acting on the fibre. Such two-pulse phase-output DAS systems are very useful but as mentioned typically require two spatially separated pulses. As the spatial resolution of the sensor is related to the size and separation of the pulses in the fibre this means that short duration pulses are typically used. However short pulses mean that less overall light is injected into the fibre each interrogation with the result that less backscatter will be detected. To achieve the same spatial resolution a two pulse system would have to use shorter pulses than a one pulse system. This can reduce the effective range of the two-pulse based system compared to the one-pulse intensity-output system.

SUMMARY OF THE INVENTION

Embodiments of the present invention aim to provide methods and apparatus for distributed fibre optic sensing which allow improved and/or additional sensing functionality.

Thus according to the present invention there is provided a method of distributed acoustic sensing comprising:
  repeatedly launching at least one interrogating pulse of coherent optical radiation into an optical fibre and detecting optical radiation which is Rayleigh backscattered from within said optical fibre;
  identifying a first stimulus acting on at least one sensing portion of the optical fibre, wherein said first stimulus results in an effective optical path length change within said sensing portion of at least the wavelength of the optical radiation; and
  determining the frequency of variation in backscatter intensity from said sensing portion in response to said first stimulus.

The method may comprise using said determined frequency to provide an indication of the effective rate of change induced by said first stimulus on said sensing portion. When the first stimulus has a strain component, the method may comprise using the determined frequency to provide an indication of the effective rate of strain along the length of the optical fibre at the sensing portion. When the first stimulus has a temperature component, the method may comprise using the determined frequency to provide an indication of the effective rate of temperature change at the sensing portion.

Identifying the first stimulus acting on at least one sensing portion may comprise analysing the backscatter intensity from said sensing portion to detect a signature characteristic of signal wrapping. The signature characteristic of signal wrapping may comprise a cyclic intensity variation wherein the backscatter signal lacks any substantial harmonics at the frequency of said cycle variation. The signature characteristic of signal wrapping may comprise a cyclic intensity variation with a frequency which varies within a band. The signature characteristic of signal wrapping may have maximum and minimum values of backscatter intensity which correspond to determined reference maximum and minimum values of backscatter intensity. The determined reference maximum and minimum values may correspond to values measured and/or predicted in response to a large amplitude stimulus.

Additionally or alternatively identifying the first stimulus acting may comprise detecting a variation in backscatter intensity for a plurality of different sensing portions of the fibre with substantially the same frequency.

In one embodiment identifying the first stimulus acting on at least one sensing portion comprises interrogating the fibre with two series of pulses of different lengths and identifying a signal whose frequency is proportional to length of pulses in each series.

The first stimulus could be detected by detecting an instance of a large amplitude strain, for instance using at least one additional detector.

The method may comprise identifying a first stimulus acting on a plurality of sensing portions of the optical fibre and identifying the sensing portions which exhibit the greatest frequency of intensity variation is response to said first stimulus.

The method may comprise determining the frequency spread of the variation in backscatter intensity from said sensing portion in response to said first stimulus. The determined frequency spread may be used to estimate the proportion of the sensing portion experiencing an optical path length change. Additionally or alternatively the method may comprise analysing the frequency of the variation in backscatter intensity from said sensing portion to detect a plurality of distinct frequency components and using detection of distinct frequency components as an indication of two discrete first stimuli acting on a sensing portion.

The method may be used for seismic monitoring, for example to determine quantitative strain rate information about an earthquake.

In another aspect the invention provides a method of processing distributed acoustic sensing data comprising:
identifying at least a first set of measurement data acquired from at least one sensing portion of a fibre optic distributed acoustic sensor in response to a first stimulus acting on said at least one sensing portion of the optical fibre,
wherein said measurement data corresponds to the intensity of light which is Rayleigh backscattered from within said at least one sensing portion of the optical fibre when repeatedly interrogated by pulses of optical radiation; and
wherein said first stimulus is a stimulus which results in an effective optical path length change within said sensing portion of at least the wavelength of the optical radiation;
the method further comprising analysing said first set of measurement data to determine the frequency of variation in backscatter intensity from said sensing portion in response to said first stimulus.

The method of this aspect may comprise analysing measurement data from said at least one sensing portion to identify said first set.

The invention also relates to apparatus for distributed acoustic sensing and in a further aspect provides a distributed acoustic sensor apparatus comprising:
an integrator configured to, in use, repeatedly generate at least one interrogating pulse of coherent optical radiation for launching into an optical fibre and detect optical radiation which is Rayleigh backscattered from within said optical fibre; and
a processor configured to:
identify a first stimulus acting on at least one sensing portion of the optical fibre, wherein said first stimulus results in an effective optical path length change within said sensing portion of at least the wavelength of the optical radiation; and
determine the frequency of variation in backscatter intensity from said sensing portion in response to said first stimulus.

The apparatus according to this aspect of the invention provides all of the same advantages as the methods described above and can be used in any or with any variants discussed.

DESCRIPTION OF THE DRAWINGS

The invention will now be described by way of example only with respect to the accompanying drawings, of which:
FIG. 6 illustrates the frequency of the detected DAS signal; and.

DESCRIPTION OF THE INVENTION

Figure 1:
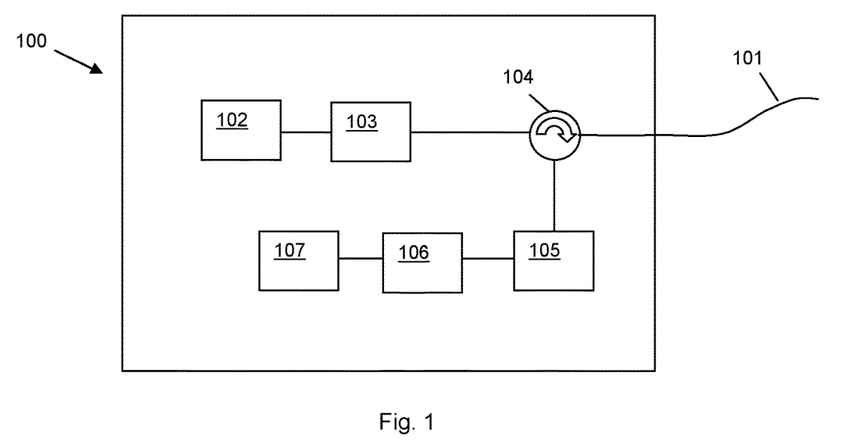
FIG. 1 illustrates a conventional fibre optic distributed sensor.

FIG. 1 shows a schematic of a general distributed fibre optic sensing arrangement. A length of sensing fibre 101 is removably connected at one end to an interrogator 100. The sensing fibre is coupled to an output/input of the interrogator using conventional fibre optic coupling means. The interrogator unit is arranged to launch pulses of coherent optical radiation into the sensing fibre 101 and to detect any radiation from said pulses which is backscattered within the optical fibre. For a Rayleigh scattering based distributed acoustic sensing (DAS) apparatus the detector will detect radiation which has been Rayleigh backscattered from within the fibre and which is thus at the same frequency as the interrogating radiation. To generate the optical pulses the interrogator unit 100 comprises at least one laser 102. The output of the laser may be received by an optical modulator 103. Note that as used herein the term "optical" is not restricted to the visible spectrum and optical radiation includes infrared radiation, ultraviolet radiation and other regions of the electromagnetic spectrum. The pulses output from the optical modulator 103 are then transmitted into the sensing fibre 101, for instance via a circulator 104.

The sensing fibre 101 can be many kilometers in length and can be, for instance 40 km or more in length. The sensing fibre may be a standard, unmodified, solid core, single mode optic fibre such as is routinely used in telecommunications applications without the need for deliberately introduced reflection sites such a fibre Bragg grating or the like. Multimode fibre can also be used but the measurements are typically of a lower quality than if a single mode fibre was used. The ability to use an unmodified length of standard optical fibre to provide sensing means that low cost readily available fibre may be used. The optical fibre will typically be protected by containing it with a cable structure. In some embodiments the fibre may comprise a fibre which has been fabricated to be especially sensitive to incident vibrations or the cable structure may have been designed to achieve the same effect. In use the fibre 101 is deployed in an area of interest to be monitored.

Optical radiation which is backscattered from said optical pulses propagating within the sensing fibre is directed to at least one photodetector 105, again for instance via circulator 104. The detector output is sampled by an analogue to digital converter (ADC) 106 and the samples from the ADC are typically passed to processing circuitry 107 for processing (although in theory the base data samples could be output). The processing circuitry 107 may process the detector samples to determine an overall backscatter intensity from each of a number of different channels, each channel corresponding to a different longitudinal sensing portion of optical fibre. In some arrangements the processing circuitry 107 may provide most of the processing to indicate any acoustic signals acting on the channels of the sensor. However in some embodiments the output from interrogator 100 may be passed to an external signal processor (not shown), which may be co-located with the interrogator or may be remote therefrom, and optionally a user interface/graphical display, which in practice may be realised by an appropriately specified PC. The user interface may be co-located with the signal processor or may be remote therefrom.

It will be noted that the interrogator unit may comprise various other components such as amplifiers, attenuators, filters etc. but such components have been omitted in FIG. 1 for clarity in explaining the general function of the interrogator.

In an intensity based DAS sensor the laser 102 (and modulator 103 if present) are configured to repetitively produce at least one interrogating pulse at a particular launch rate, often called a ping rate. When an interrogating pulse propagates within the optical fibre some light will be scattered from the intrinsic scattering sites within the optical fibre. At least some of this backscattered light will be guided back to the beginning of the optical fibre where it can be detected. At any instant the light arriving at the detector may comprise light scattered from a range of scattering sites distributed through a section of fibre.

Figure 2:
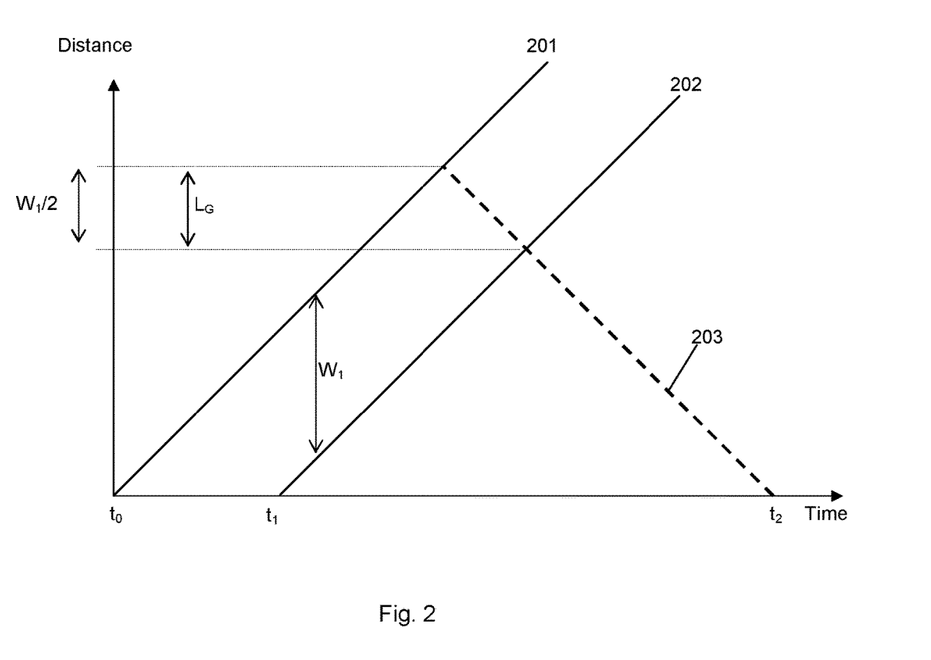
FIG. 2 illustrates the propagation of an optical pulse in the sensing fibre.

FIG. 2 illustrates the propagation of a pulse in the optical fibre and shows distance along the fibre against time. Lines 201 and 202 illustrate the leading and trailing edges of the pulse respectively. Thus at time $t_0$ the leading edge of the pulse enters the optical fibre and at $t_1$ the trailing edge of the pulse enters the fibre. The time between $t_0$ and $t_1$ therefore corresponds to the duration of the pulse. The pulse propagates in the fibre at a velocity equal to c/n where c is the speed of light in vacuo and n is the effective refractive index of the optical fibre. In the fibre the pulses will thus have a spatial width, $W_1$, represented by the vertical distance between lines 201 and 202.

As the pulse propagates in the optical fibre some light will be backscattered towards the start of the fibre. This backscattered light will also travel at a velocity equal to c/n. Consider the light reaching the detector. Line 203 represents the trajectory of light which could possibly be received at the start of the optical fibre at a given instant $t_2$. Any backscattering which occurs at a time and distance into the fibre that lies on line 203 would be received at the start of the fibre at the same instant $t_2$. Thus it can be seen that light which is scattered at various times from a first section of the fibre as the pulse propagates through that section will be coincident at the start of the fibre (and hence coincident on the detector). It can also be seen that the width of this first section of fibre is equal to half the width of the pulse in the fibre, i.e. $W_1/2$.

This means that at any instance the backscattered light received at the start of the optical fibre corresponds to backscattering in the fibre from a number of scattering sites distributed through a certain section of fibre. The length of this section of fibre is defined by the pulse width of the interrogating radiation. The minimum spatial size of the discrete sensing portions, which may be referred to as the gauge length, is thus defined by the width of the interrogating pulse.

The backscatter signal received at the detector at any instant is therefore an interference signal resulting from the combination of the scattered light from all of the scatter sites within a section of fibre. The distribution of scattering sites within a given section of fibre is effectively random and thus the number of scattering sites and distribution of such sites within a section of fibre will vary along the length of the fibre. Thus the backscatter intensity received from different sections of fibre will vary in a random way. However, in the absence of any environmental changes affecting the fibre the distribution of scattering sites in a given section of fibre will remain the same and thus the backscatter intensity from a given section of fibre will be consistent for identical interrogating pulses. Any mechanical disturbances of the fibre, such as bending caused by an incident acoustic wave, will change the distribution of scattering sites and the effective refractive index of that part of the fibre and thus lead to a change in the resulting backscatter intensity.

In a simple model the number of scattering sites can be thought to determine the amount of scattering that could occur and the distribution of such scattering sites determines the interference. An acoustic stimulus leading to a strain on the fibre may result in a change of optical path length within the relevant section of fibre (which could be a physical change in length and/or a change in the effective refractive index in part of the fibre). In this simple model this can be thought of as changing the separation of the scattering sites but without any significant effect on the number. The result is a change in interference characteristics. In effect the acoustic stimulus leading to optical path length changes in the relevant section of fibre can be seen as varying the bias point of a virtual interferometer defined by the various scattering sites within that section of fibre.

Figure 3:
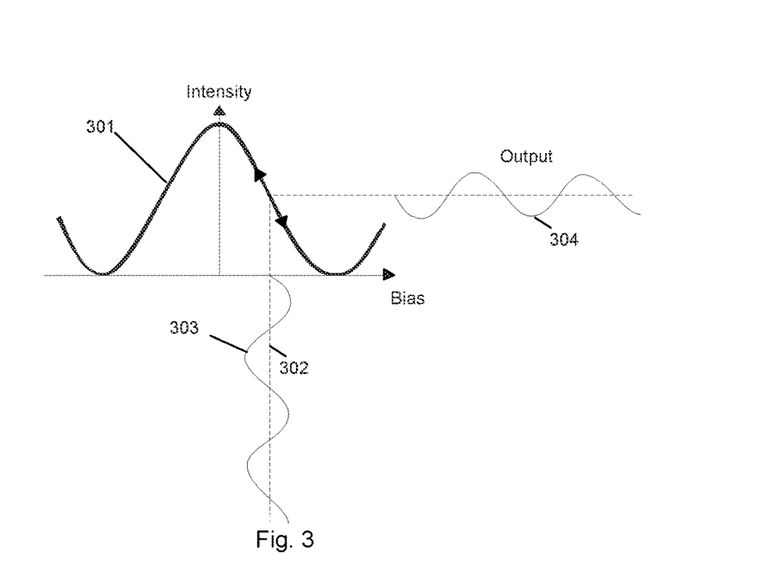
FIG. 3 illustrates the principles of variation in backscatter intensity with bias point.

FIG. 3 illustrates an idealised plot 301 of backscatter intensity against bias point for a given section of fibre. In the absence of any external stimulus a given section of fibre can be thought of as having a steady state bias point, i.e. the operating point of a given section of fibre (and equivalently a given channel of the DAS sensor) will lie somewhere on plot 301. FIG. 3 illustrates an operating point 302 for a given section of fibre.

Any acoustic stimulus causing a change in path length will result in a variation of the bias point about this operating point, i.e. move the operating point of the channel relative to the steady state bias point. A sinusoidal input stimulus resulting in a corresponding oscillating optical path length variation is illustrated as input 303. At this section of the operating curve a path length change in one direction will lead to an increase in backscatter intensity and a path length change in the other direction will lead to a decrease in backscatter intensity. This will cause the intensity of backscatter from that section to vary as indicated thus resulting in the output 304.

Thus by repeatedly launching interrogating pulses into the fibre and looking at the backscatter intensity the same time after launch for each pulse, any changes in backscatter intensity from a given section of fibre can be determined and hence any acoustic disturbance of the fibre detected. Note as used herein the term "acoustic" is taken to mean any type of pressure wave or vibrational type stimulus and for the avoidance of doubt will include seismic stimuli. The term acoustic shall also be taken to cover ultrasonic and infrasonic stimuli.

Such DAS sensors are very useful and have been used in a range of different applications. However it can be difficult to provide accurate quantitative information about the stimulus acting on the sensing fibre because the variations in intensity for a given channel in response to a given input stimulus may be non-linear and also the gain of the channels, i.e. the amount of intensity change for a given stimulus is also variable. In the example illustrated in FIG. 3 the operating point is in a near linear section of the operating curve and thus the output is fairly undistorted with respect to the input stimulus. However it will be appreciated that a different operating point may lead to a different response to the same input stimulus. Were the operating point to be near a maximum then the overall intensity of backscatter may be higher but the change in intensity due to a given stimulus may be lower and were the operating point to be near a minimum then the backscatter intensity may be low and difficult to detect and any variation may again be low.

Different sections of fibre, i.e. different channels, will have different operating points (as well as different maximum possible output intensities) and thus each channel can thus be thought of as having a different operating curve, i.e. the response to any input stimulus about its current operating point. This means that the response from one channel to a given stimulus may be different to the response from a different channel. Further the operating point of a given channel may drift over time. These effects mean that typically it can be difficult to determine any reliable quantitative information from such an intensity based DAS sensor.

Embodiments of the present invention however provide methods and apparatus for providing quantitative information about environmental changes acting on the sensing fibre. In embodiments of the present invention the sensing optical fibre may be repeatedly interrogated with pulses of coherent optical radiation and the intensity of radiation which is Rayleigh backscattered detected as described above. The method of an embodiment of the present invention involves identifying a first stimulus acting on at least one sensing portion of the optical fibre, wherein said first stimulus results in an effective optical path length change within said sensing portion of at least the wavelength of the optical radiation, and determining the frequency of variation in backscatter intensity from said sensing portion in response to said first stimulus.

It has been appreciated that certain types of stimulus may result in a relatively continuous change in effective optical path length over several interrogations of the optical fibre (e.g. continuous increase or continuous decrease in effective optical path length) and which will cause the operating point of a given channel of the DAS sensor to traverse at least one maximum and at least one minimum in backscatter intensity. Thus, even though the stimulus provides a unidirectional change in optical path length the backscatter intensity from such a sensing portion will appear to have a frequency of variation.

As mentioned the backscatter signal for a sensing portion can be thought of as the interference signal from multiple different scattering sites within that sensing portion. Any optical path length change that affects that sensing portion will therefore result in a change in the distribution of the scattering sites and hence the backscatter signal.

Consider, for example, that a change in optical path length affects substantially the whole of a sensing portion. For simplicity consider that the change in optical path length is spread relatively evenly across the whole sensing portion. As the effective optical path length changes the path length between the various scattering sites will change, resulting in a phase change between the scattering sites. However the amount of optical path length change between any two scattering sites will depend on the separation of the scattering sites within the sensing portion. For instance consider a first scattering site located at the front of a sensing portion and a second scattering site located at the end of a sensing portion. If the effective optical path length between the front and the end of the sensing portion changes by an amount equal to half of the wavelength of the interrogating radiation, the resulting phase change between the first and second scattering sites (over a double pass through the sensing portion) will be $2\pi$. Thus for such a change in path length the interference signal component from these two scattering sites will go through a full phase cycle. However for a third scattering site located in the middle of the sensing portion the optical path length variation in a round trip from the first to the third scattering sites would be less and would lead to a phase change equal to $\pi$.

Over the whole length of a sensing portion an optical path length change substantially equal to the wavelength of the interrogating radiation will typically lead to a full phase cycle of intensity variation. With an optical path length change equal to the wavelength of the interrogating radiation the mean phase change between pairs of scattering sites will be substantially equal to $2\pi$. It will be noted however that actual phase change between most pairs of scattering sites will not be equal to $2\pi$ and thus the overall intensity of the backscatter signal before and after an optical path length equal to the wavelength of the interrogating radiation is likely to be different.

Figure 4:
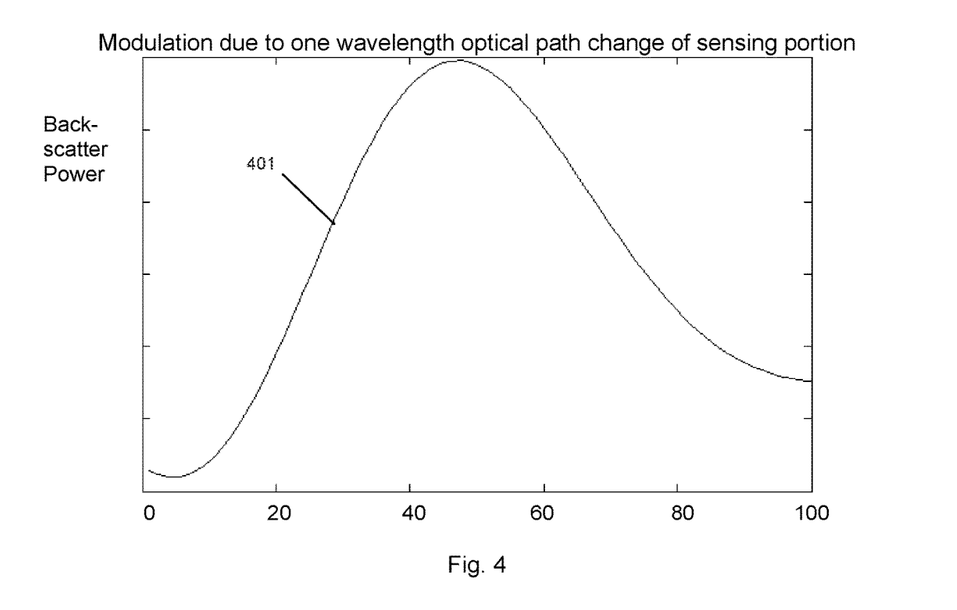
FIG. 4 illustrates the principles of variation in backscatter intensity in response to a unidirectional continuous stimulus.

This is illustrated in FIG. 4 which shows part of an operating curve 401 for a given sensing portion of the optical fibre, i.e. channel of the DAS sensor, illustrating the backscatter power from a sensing portion against optical path length change over a sensing portion (expressed as a percentage of the wavelength of the interrogating radiation). Consider that at a first time the sensing portion starts with no path length modulation. A continuous stimulus causes a continuous variation in optical path length causing the optical path length of the sensing portion to increase or 'stretch'. This will cause the backscatter intensity from such a channel to have the form illustrated.

It has therefore been appreciated that whilst each channel may have a random operating point, and the maximum backscatter intensity may also vary between channels, a change in optical path of at least one wavelength of the interrogating radiation within any sensing portion will result in such sensing portion exhibiting a full phase cycle of backscatter intensity variation. Further the frequency of such intensity variation resulting from a unidirectional change in path is directly related to the rate of optical path length change which is in turn related to the stimulus.

Thus it has been appreciated that in response to a stimulus, referred to herein as a first stimulus, which causes an effective optical path length change of at least $\lambda$ over the sensing portion (where $\lambda$ is the in-vacuum wavelength of the interrogating radiation), the frequency of the resulting intensity variation is directly related to the effective rate at which the first stimulus is acting on the sensing fibre. Thus by identifying those channels which are experiencing a first stimulus and determining the resultant frequency of intensity variation quantitative information about the stimulus can be determined.

There are various physical processes which may result in a first stimulus acting on the optical fibre. For a typical DAS sensor the wavelength of the interrogating radiation is of the order of 1.5 micron or so. Thus effective optical path length changes of about 1.5 micron or so would lead to such an intensity modulation in the output from a sensing portion. It will be appreciated that an effective optical path length change may result from a physical change in length of the fibre of the sensing portion and/or a refractive index modulation. A strain acting on the fibre may cause a physical change in length with also a modulation of refractive index. Large scale strain events, such as large seismic waves may strain the fibre in this way.

In addition a change in temperature will also lead to a change in optical path length, principally through a refractive index modulation. Relatively low changes in temperature can be sufficient to provide an optical path length change of at least $\lambda$. Thus embodiments of the present invention provide methods and apparatus for sensing temperature variations using DAS sensing techniques. This method of temperature sensing provides a rapid sensitivity to temperature variations that may not be readily achievable using other fibre optic sensing techniques such as distributed temperature sensing based on Brillouin or Raman scattering.

The optical path length change resulting from a change in temperature may depend on the type of optical fibre used and the construction of the fibre optic cable. However, the relatively high thermal expansion coefficients of some coating/buffer materials, e.g. nylon can dominate the change on the fibre itself. For instance, consider a sensing fibre interrogated with pulses of wavelength, $\lambda$, of about 1.5 micron to provide sensing portions of about 10 m in length. If the sensing fibre were an acrylate fibre optic in a loose tube cable arrangement interrogated a temperature change of about 0.008K would result in an optical path length variation equal to $\lambda$. However for a tight buffered nylon fibre the resulting OPL change could be around ten times as great for the same temperature variation. For applications to sensing of temperature variations the fibre construction could be chosen to maximise sensitivity to temperature variations.

It will be clear therefore that even with standard optical fibre fairly small changes in temperature, for instance of the order of 0.1K acting on a sensing portion would lead to the optical response from that sensing portion going through several phase cycles. A change of about 0.1K over a time period of about an hour may be detectable above the system noise, such as laser phase noise for example. Thus the method may provide quantitative measures of temperature variations of the order of 0.1K or greater occurring on timescales of about an hour or faster.

In practice for a strain stimulus acting along the length of the fibre the physical change in length will be partly offset by the resultant change in refractive index (n) and so a physical change in length of about $1.2\lambda/n$ may be required to achieve an effective optical path length change of $\lambda$ for a conventional fibre optic. The exact relationship between physical length change and optical path length change for a given type of sensing fibre could be readily determined. Therefore the strain rate is equal to approximately $1.2\lambda f/nL$ where f is the observed frequency of the signal and L is the effective length of the sensing portion. In most single pulse DAS sensors L is approximately equal to the half the spatial length of the interrogating pulse of optical radiation.

It should be noted that for strain sensing the effect on optical path length will be greatest for longitudinal strains acting on the sensing fibre as compared to transverse strains. This can be used to give directional sensitivity with regard to strain. If the fibre is deployed so that different parts of the fibre, and hence different sensing portions, run in different directions to one another this can allow the strain rate to be resolved into various components in different directions.

Likewise the effects of temperature on the type of sensing fibre could be determined and used to relate the detected frequency to a rate of change in temperature, for instance via testing of that type of sensing optic with known temperature variations. Thus, in use, by determining the rate of change of optical path length and the time over which the change occurred a value of the amount of temperature change can also be determined.

As mentioned the stimulus could be a relatively continuous strain, such as might be experienced with a relatively large amplitude acoustic/seismic stimulus. For example an earthquake may produce large amplitude, relatively long period seismic waves that may act along the length of the sensing fibre to provide an effectively path length change of the order of several times the wavelength of the interrogating radiation. In which case there may be a relatively strong frequency component in the output of the sensing channels. Determining the frequency will indicate the strain rate along the length of the fibre. The frequency could be determined by forming a spectrogram of the data from a given sensing channel.

Even for a stimulus which causes just one phase cycle of intensity modulation the frequency of modulation could be detected, for instance by looking at the intensity output and determining the time between an intensity peak and an intensity minimum.

The method may therefore involve using the determined frequency to provide an indication of the effective rate of change induced by said first stimulus on said sensing portion. As mentioned the first stimulus may have a strain component and the method may involve using the determined frequency to provide an indication of the effective rate of strain along the length of the optical fibre at said sensing portion. As also mentioned the first stimulus may also have a temperature component and the method may involve using the determined frequency to provide an indication of the effective rate of temperature change at said sensing portion.

A processor, which may be part of the DAS sensor or arranged to receive the data from a DAS sensor, may thus determine the frequency of intensity variation and determine, possibly based on stored data in a look-up table or similar, the strain rate or rate of temperature variation that corresponds to that frequency, given the type of sensing fibre used and the wavelength of the interrogating radiation.

The discussion above has focussed on optical path length changes that affect substantially the whole of the sensing portion. With sensing portions having a length of the order of say 10 m then any general temperature changes in the environment or large scale strains may cause an optical path length change which is spread throughout the sensing portion. In such a case, as discussed above, there will be a range of phase changes between light scattered from a scattering site at the start of the sensing portion and light scattered from a scattering sire further into the sensing portion due to the range in change in optical path length. This tends to mean that in a spectrogram of the backscatter intensity from such a sensing portion during the optical path length change there will be a spread of frequencies up to a certain maximum frequency. In other words the DAS measurement signal is relatively broad band up to a certain maximum frequency. It is the maximum frequency which is related to strain and thus references to determining the frequency include determining the maximum frequency due to the first stimulus.

If the optical path length change were more localised to only part of the sensing portion the DAS signal would tend to be more narrowband. For example imagine that an optical path length change affects only a sub-section of a sensing portion, which will be referred to herein as a 'dynamic sub-section', i.e. a sub-section experiencing a change, and that the change in path length is spread through-out the whole of the dynamic sub-section. Imagine also that there is at least one 'static sub-section' which is not experiencing any change in optical path length. As an example consider that there is a front static sub-section and also a rear static sub-section separated by a dynamic sub-section.

Consider the path length change between a first reflector (from a first scattering site) at the front of the sensing portion and a second reflector (from a second scattering site) further into the sensing portion. If the second reflector is within the front static sub-section then there is no optical path length change between the two reflectors (as the path length change occurs further into the sensing portion). If the second reflector is within the rear static sub-section then there is an optical path length change, because of the path length change in the intervening dynamic sub-section. It will be noted though that the optical path length will be entirely due to the optical path length change in the dynamic sub-section and thus will be the same for each possible second reflector in the rear subsection. Thus the contribution to the back-scatter signal from the front and rear static sub-sections can thought of as approximating to the signal from a two mirror interferometer.

If the second reflector is within the dynamic sub-section the optical path length change experienced will depend on the position of the second reflector. Thus the contribution to back-scatter signal arising due to interactions between a reflector in the front static sub-section and the dynamic sub-section will exhibit a range of optical path length changes. The same is true for interactions between a reflector in the dynamic sub-section and the rear static sub-section.

If the dynamic section is relatively small the contribution to the overall signal arising from reflectors in the dynamic section will be relatively low compared to the contribution from the two static sections. Thus the signal from the two static sub-sections may dominate. It will be appreciated that a phase change of $\lambda/2$ will lead to a full phase cycle in the interference signal between a front and rear static-subsection separated by a dynamic sub-section. The interference signal arising from these sections will also tend to be more like a pure sine wave for a constant change in optical path length in the dynamic sub-section.

Thus a stimulus that causes an optical path length change of at least $\lambda/2$ in a relatively small proportion of a sensing portion will result in a backscatter intensity signal from said sensing portion that exhibits a relatively narrowband frequency variation.

In some embodiments the frequency spread of the backscattered signal where there is a detected variation in intensity in response to a first stimulus may be used as an assessment of the extent of the sensing portion which is undergoing a path length change. In other words the method may determine whether the detected variation is a broadband signal up to a certain maximum, indicating that a significant proportion of the sensing portion is subject to an optical path length change, or a narrowband signal with most power concentrated in a narrow frequency band, which could indicate that the optical path length change is occurring only in a small proportion of the sensing portion. This may be used to estimate the relative size of the stimulus acting on the fibre. The method may therefore comprise looking at the spread of frequency components in the detected signal and for example the relative proportion of each frequency component. A processor could be configured to perform frequency analysis, for instance to generate and analyse a spectrogram.

Looking at the spectral spread of the backscatter signal thus provides the ability to determine the relative size of stimulus acting on the fibre. This represents another novel aspect of embodiments of the invention.

This technique could also be used to determine if there were more than one stimulus causing localised continuous changes of strain acting on a single sensing portion of fibre. For instance if there was a first small dynamic sub-section of a sensing portion between front and middle static sub-sections and also a second small dynamic sub-section of a sensing portion between the middle and a rear static sub-sections, the resulting backscatter intensity signal would exhibit a signal with up to three distinct frequency components. A first component would be due to interference between the front and middle static sub-sections with a frequency related to the rate of path length change in the first dynamic sub-section. A second signal component would due to interference between the middle and rear sub-static sections with a frequency related to the rate of path length change in the second dynamic sub-section and a third signal component would due to interference between the front and rear static sub-sections with a frequency related to the rate of path length change in both dynamic sub-section.

The method may therefore involve detecting more than one distinct relatively narrowband frequency component as an indication of more than one localised stimulus acting on a sensing portion. The method may also determine the frequency of the components so as to determine the rates of path length change and rates of strain or temperature change.

It will be appreciated that the methods described above, such as using the determined frequency as a measure of the magnitude of the rate of change, apply to a frequency variation induced by a first stimulus, i.e. one which creates a change in optical path length which is sufficiently large, e.g. of the order of the wavelength of the interrogating radiation or greater, over a period of a plurality of interrogations of the sensing fibre. The method therefore involves identifying a first stimulus acting on at least one sensing portion or in other words identifying an intensity variation for sensing channels that resulted from such a first stimulus. In some instances this may be inherent. For instance as mentioned above the technique may be applied to data acquired from a large scale seismic event such an earthquake. If it is known that the data from the DAS sensor was acquired from a sensing fibre during an earthquake it may be assumed that the sensing portions were subject to a first stimulus and will exhibit a signal with at least a component due to the first stimulus.

In some instances however it may be necessary to distinguish signals due to acoustic stimuli such as illustrated in FIG. 3 which typically do not result in a full phase cycle of modulation from a signal produced from a first stimulus. In some embodiments therefore identifying the first stimulus acting on a sensing portion comprises analysing the backscatter intensity from said sensing portion to detect a signature characteristic of signal wrapping. By signal wrapping is meant that the backscatter intensity goes through at least one phase cycle.

The signal produced in response to a first stimulus causing signal wrapping, with an intensity variation at a given frequency, is typically quite distinct from an acoustic signal at a similar frequency (which does not cause signal wrapping). In other words the full-scale noise as seen when the signal wraps is unlikely to be replicated by an incident acoustic signal.

Typically for an acoustic signal at a first frequency the backscatter intensity signal will comprise harmonics at the first frequency. A frequency modulation caused by signal wrapping will lack such harmonics. A processor may therefore look for harmonics of a detected frequency component and identify a signal variation in response to a first stimulus by a lack of any substantial harmonics at said first frequency. Also the effective optical path length change induced by the first stimulus is unlikely to be very smooth. Thus the frequency of intensity variation will actually vary within a frequency band, whereas an incident acoustic signal may have a more clearly defined frequency. Thus the method may additionally or alternatively look for a signature characteristic of signal wrapping which comprises a cyclic intensity variation with a frequency which varies within a band. Also, as mentioned above when the first stimulus causes a path length change over a large proportion of the sensing portion the resulting backscatter signal is typically a relatively broadband signal.

The intensities which are observed as the bias/operating point of a channel varies due to the optical path length variation (as shown in FIG. 4) will also have characteristic maximum and minimum values. As a first stimulus may cause the bias point to move over many cycles the maximum and minimum values obtained will be similar to these characteristic values. In contrast the ranges of values produced by an acoustic signal, such as that produced by input signal 303 in FIG. 3, can be much smaller in amplitude.

A further way to distinguish between signals resulting from a first stimulus and an acoustic stimulus acting on the sensing fibre would be to interrogate the fibre using at least two series of pulses of different lengths. In response to an acoustic stimulus the frequency of any detected intensity variation would be independent of the pulse length and thus would be the same for both pulse series. However in response to a first stimulus which results in a path length change spread throughout substantially all of a sensing portion the observed frequency would typically be proportional to the pulse length. As mentioned above the returns from a given sensing portion will go through a full phase cycle when optical path length change over the whole sensing portion is equal to A, and thus the rate of intensity variation depends on the size of the sensing portion as defined by the pulse width.

The two pulse series could be generated from the same laser by interleaving the two series together though this would halve the effective pulse transmission rate, or ping rate, for each series. Alternatively both series could be transmitted at the same time, and at the full ping rate by using different wavelengths for each pulse series.

For large amplitude stimuli the stimulus may be expected to affect several sensing portions of the sensing fibre. Thus identifying the first stimulus may involve detecting a variation in backscatter intensity for a plurality of different sensing portions of the fibre with substantially the same frequency.

In some embodiments, for providing quantitative strain rate information about large amplitude acoustic/seismic event, identifying the first stimulus may involve detecting an instance of a large amplitude strain which could involve using other sensors such as seismometers of the like. For instance in an application to seismic monitoring a seismometer may be used to record accurate seismic information during an event of interest. However the seismometer is a point sensor. One or more sensing fibres may be deployed in the area of interest in a desired pattern to provide good sensing coverage and interrogated by one or more DAS interrogator units. The seismometer data may be used to identify the period of interest when a first stimulus is/was acting on the sensing fibres.

The method may involve identifying a first stimulus acting on a plurality of sensing portions of the optical fibre and identifying the sensing portions which exhibit the greatest frequency of intensity variation is response to said first stimulus and/or a frequency above a certain threshold. The greater the frequency, the greater the rate of change induced by the first stimulus. When used for detecting strain, for instance in seismic monitoring, the channels with the greatest frequency will be those where the strain rate was highest—which may be the areas most likely to be damaged or affected by a seismic event. For temperature sensing a frequency above a certain value may indicate a rapid change in temperature which may generate an alert. For instance the sensing fibre could be deployed along a pipeline and relatively rapid changes in temperature used as a possible indication of a leak.

It will be clear from the foregoing that the methods and apparatus of embodiments of the present invention may be used for seismic monitoring and the DAS sensor may be used to determine quantitative strain rate information about an earthquake.

Figure 5:
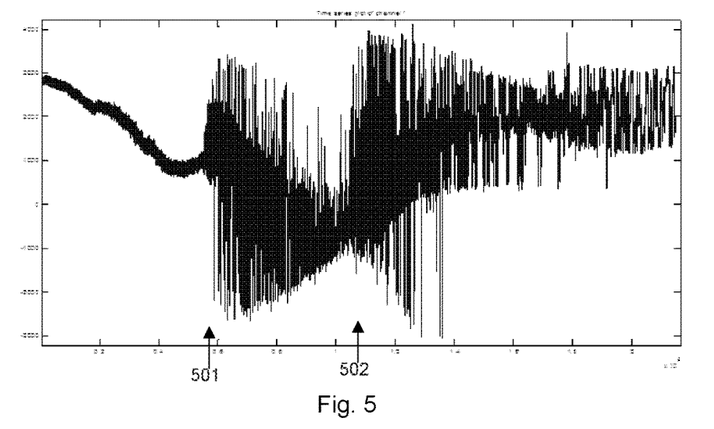
FIG. 5 illustrates data from a DAS sensor in response to a large amplitude, long period strain.

FIG. 5 shows data acquired from an intensity based DAS sensor deployed in a region that experienced an earthquake. FIG. 5 shows a time series of the optical power measured from one channel of the DAS sensor during the earthquake.

Before the time point 501 the detected intensity shows the typical low frequency drift in backscatter intensity with a small acoustic variation imposed thereon. At time 501 the slow drift dramatically changes and the measurement signal starts wrapping as a large continuous strain acts on the sensing fibre due to the arrival of the P wave associated with the earthquake (the fact that this corresponds to the P wave was verified by looking at timings of seismographs of the earthquake at various locations around the epicentre). The height of each peak in intensity is random and the strain rate gradually reduces until time 502 when the S wave generated by the earthquake arrives which results in more signal wrapping throughout the rest of the time series displayed.

Figure 6:
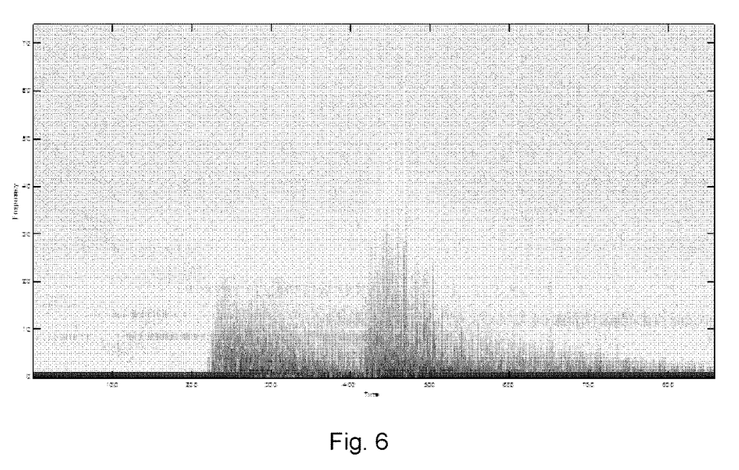

FIG. 6 shows a spectrogram plot of the frequency of the detected backscatter signal against time (with intensity at the relevant frequency being represented by colour in a non black and white version). It was determined from other sensors that the frequency of the seismic waves was low, generally less than about 1 Hz, however it can be seen that the data from the DAS sensor shows frequency components up to about 40 Hz maximum.

Taking the maximum frequency, f, as 40 Hz with this DAS sensor where the sensing portion length, L, was about 8 m, the wavelength λ is about 1.5 μm and the refractive index n is about 1.5 then using the relation discussed above that the strain rate is equal to $1.2\lambda f/nL$, the maximum strain rate was determined to be $6\times10^{-6}$ $s^{-1}$.

Figure 7A:
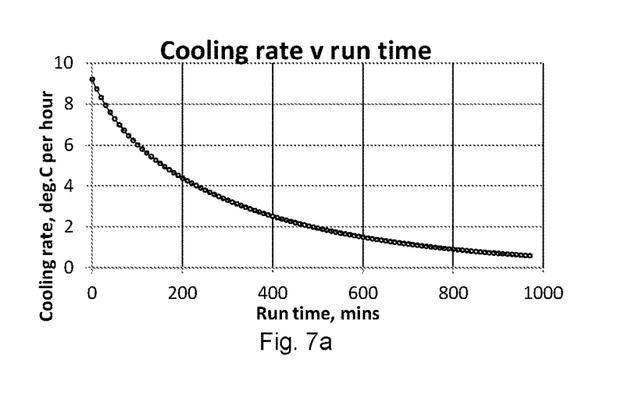
FIGS. 7a-c illustrate a temperature variation applied to a part of an optical fibre and the resulting data from a DAS sensor.
Figure 7B:
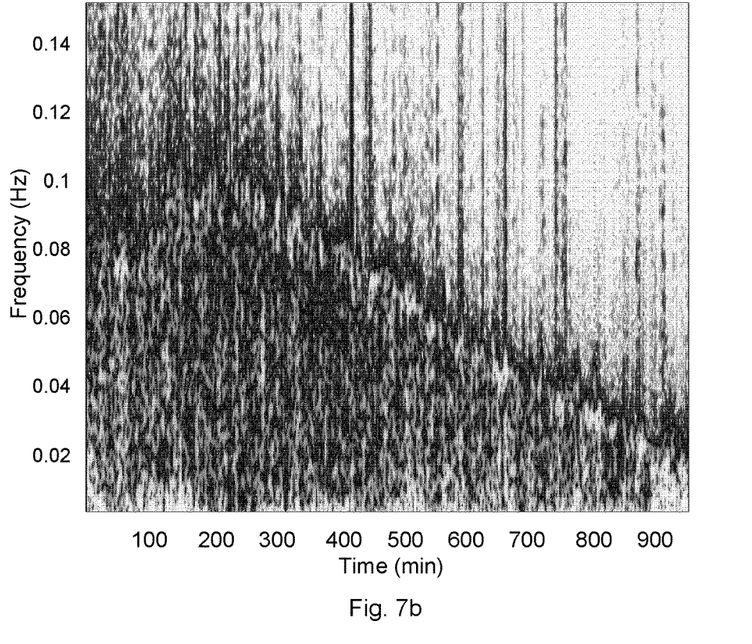
Figure 7C:
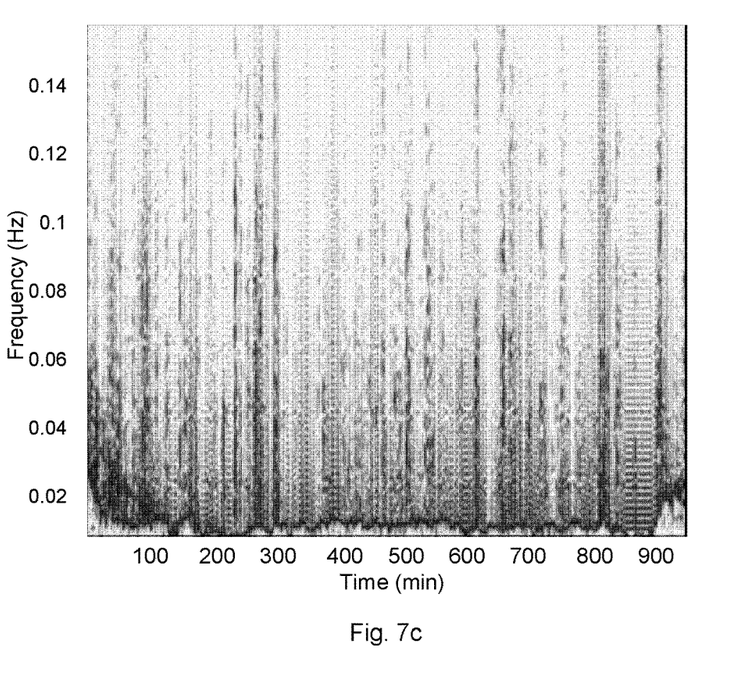

FIGS. 7a-c show some data acquired using a DAS sensor on an optical fibre experiencing a controlled temperature change. This data was acquired by taking a length of fibre and immersing it in heated water in an insulated contained. The water was allowed to cool slowly to room temperature. The temperature of the water surrounding the fibre was measured independently. FIG. 7a shows the measured rate of cooling of the water. FIG. 7b shows a spectrogram of the DAS measurement signal acquired over time from a sensing portion of the optical fibre which was immersed in the water. FIG. 7c shows for comparison a spectrogram of the DAS measurement signal acquired at the same time from a different sensing portion of the optical fibre, which was not heated.

It can be seen in FIG. 7c that during the time that the measurements were acquired that there were no significant spectral content in the sensing portion that was not subjected to heating. Thus the spectral content observed in heated sensing portion illustrated in FIG. 7b is substantially due to the optical path length change arising from heating, and then subsequent cooling. It can be seen from FIG. 7b that there is a strong spectral response due to the path length change caused by cooling and the maximum frequency off the signal drops over time as the rate of cooling reduces. In this experiment the optical fibre had a tightly bound nylon jacket and it was found that once the temperature was low enough for the stiffness of the nylon to dominate the maximum observed frequency of the spectrogram showed the expected correlation with cooling rate.

It can also be seen in the spectrogram of FIG. 7b that there is a spread of frequency components in the detected signal, i.e. the signal is relatively broadband up to the maximum frequency as the sensing portion was immersed in the water and thus a significant part of the fibre portion was experiencing an optical path length change. In another experiment a flame was applied to the casing of the optical fibre for a short time and then the heated section allowed to cool. The DAS signal from the relevant sensing portion showed a strong spectral response but with a much narrower frequency band.

It will of course be appreciated that the pulse characteristics used for one interrogation, i.e. the intensity and frequency of the interrogating radiation for each pulse and the pulse duration and/or number of pulses in an interrogation, should be repeated for a subsequent interrogation in order for the intensity of the backscatter returns to be compared. Clearly if a greater amount of light is injected in one interrogation than the next, for instance by altering the overall pulse duration and/or intensity, this would be expected to result in a variation in backscatter intensity. Altering the number of pulses and/or pulse duration between interrogations would also result in the backscatter from different sections of the fibre being compared. In addition varying the frequency of the interrogating radiation could also lead to a variation in the degree of interference in the backscatter signal. Therefore in order to ensure that any variation in backscatter intensity is due to disturbances acting on the fibre, rather than a variation in the properties of the interrogating radiation, the backscatter from interrogations having the same pulse characteristics should be compared. As mentioned in intensity based DAS systems typically each interrogation consists of a single continuous pulse of a constant frequency.

The launch repetition rate, also referred to as the ping rate, is therefore set so that the time between interrogations is at least as long as the round trip time for light to reach the end of the fibre and return (or, for a very long fibre, a distance into the fibre from which no significant backscatter is expected). This ensures that any backscattered light received at the start of the fibre can be uniquely identified with a section of fibre and the backscatter signals from two interrogations do not interfere with each other at the detector. For a fibre which is 40 km this would require enough time to allow a round trip in the fibre of 80 km. If the refractive index of the fibre is n=1.5 say so that the speed of light in the fibre is roughly $2\times10^8$ $ms^{-1}$ then the time between interrogations should be at least 0.4 ms and the ping rate should be less than 2.5 kHz. Obviously higher ping rates could be used for shorter fibres. Clearly the ping rate determines the effective sample rate of the sensor and thus the ping rate should ideally be set high enough so that the Nyquist limit is above the maximum frequency of the acoustic signals of interest.

It will therefore be appreciated that if the first stimulus results in more than half a phase cycle between interrogations the signal is saturated, in other words if the strain rate leads to a change of greater than λ/2 between each interrogating pulse the frequency signal would start to alias. For a 40 km system with λ=1.5 μm and L=5 m this would be a strain rate of about $3\times10^{-4}$ $s^{-1}$.

Note that as used in this specification the term interrogation shall be taken to mean an instance of launching interrogating radiation into the fibre and detecting the backscatter signal from the fibre. Typically an interrogation may comprise launching a single continuous pulse of a substantially constant frequency.

Whilst the embodiments above have been described in relation to conducting DAS sensing it will be clear that the method can be applied to data acquired using a DAS sensor, provided that the relevant frequency data has not been removed by filtering. Thus embodiments of the present invention also extend to processing of data acquired by DAS sensors.

The invention has been described with respect to various embodiments. Unless expressly stated otherwise the various features described may be combined together and features from one embodiment may be employed in other embodiments.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of distributed acoustic sensing comprising:
repeatedly launching at least one interrogating pulse of coherent optical radiation into an optical fibre and detecting optical radiation which is Rayleigh backscattered from within said optical fibre;
identifying a first stimulus acting on at least one sensing portion of the optical fibre, wherein said first stimulus results in an effective optical path length change within said sensing portion of at least the wavelength of the optical radiation; and determining the frequency of variation in backscatter intensity from said sensing portion in response to said first stimulus wherein the determined frequency is used to provide an indication of the effective rate of change induced by said first stimulus on said sensing portion.

2. A method as claimed in claim 1 wherein said first stimulus has a strain component and the method comprises using said determined frequency to provide an indication of the effective rate of strain along the length of the optical fibre at said sensing portion.

3. A method as claimed in claim 1 wherein said first stimulus has a temperature component and the method comprises using said determined frequency to provide an indication of the effective rate of temperature change at said sensing portion.

4. A method as claimed in claim 1 where identifying said first stimulus acting on at least one sensing portion comprises analysing the backscatter intensity from said sensing portion to detect a signature characteristic of signal wrapping.

5. A method as claimed in claim 4 wherein said signature characteristic of signal wrapping comprises a cyclic intensity variation and wherein said backscatter signal lacks any substantial harmonics at the frequency of said cycle variation.

6. A method as claimed in claim 4 wherein said signature characteristic of signal wrapping comprises a cyclic intensity variation with a frequency which varies within a band.

7. A method as claimed in claim 4 wherein said signature characteristic of signal wrapping has maximum and minimum values of backscatter intensity which correspond to determined reference maximum and minimum values of backscatter intensity.

8. A method as claimed in claim 7 wherein said determined reference maximum and minimum values of backscatter intensity correspond to maximum and minimum values measured and/or predicted in response to a large amplitude stimulus.

9. A method as claimed in claim 1 where identifying said first stimulus acting on at least one sensing portion comprises detecting a variation in backscatter intensity for a plurality of different sensing portions of the fibre with substantially the same frequency.

10. A method as claimed in claim 1 where identifying said first stimulus acting on at least one sensing portion comprises interrogating the fibre with two series of pulses of different lengths and identifying a signal whose frequency is proportional to length of pulses in each series.

11. A method as claimed in claim 1 where identifying said first stimulus comprises detecting an instance of a large amplitude strain.

12. A method as claimed in claim 11 wherein said large amplitude strain is detected using at least one additional detector.

13. A method as claimed in claim 1 comprising identifying a first stimulus acting on a plurality of sensing portions of the optical fibre and identifying the sensing portions which exhibit the greatest frequency of intensity variation is response to said first stimulus.

14. A method as claimed in claim 1 comprising determining the frequency spread of the variation in backscatter intensity from said sensing portion in response to said first stimulus.

15. A method as claimed in claim 14 comprising using said determined frequency spread to estimate the proportion of the sensing portion experiencing an optical path length change.

16. A method as claimed in claim 1 comprising analysing the frequency of the variation in backscatter intensity from said sensing portion to detect a plurality of distinct frequency components and using detection of distinct frequency components as an indication of two discrete first stimuli acting on a sensing portion.

17. A method as claimed in claim 1 used for seismic monitoring.

18. A method as claimed in claim 17 used for determining quantitative strain rate information about an earthquake.

19. A method of processing distributed acoustic sensing data comprising:
identifying at least a first set of measurement data acquired from at least one sensing portion of a fibre optic distributed acoustic sensor in response to a first stimulus acting on said at least one sensing portion of the optical fibre,
wherein said measurement data corresponds to the intensity of light which is Rayleigh backscattered from within said at least one sensing portion of the optical fibre when repeatedly interrogated by pulses of optical radiation; and
wherein said first stimulus is a stimulus which results in an effective optical path length change within said sensing portion of at least the wavelength of the optical radiation;
the method further comprising analysing said first set of measurement data to determine the frequency of variation in backscatter intensity from said sensing portion in response to said first stimulus wherein the determined frequency of variation is used to provide an indication of the effective rate of change induced by said first stimulus on said sensing portion.

20. A method as claimed in claim 19 further comprising analysing measurement data from said at least one sensing portion to identify said first set.

21. A distributed acoustic sensor apparatus comprising:
an integrator configured to, in use, repeatedly generate at least one interrogating pulse of coherent optical radiation for launching into an optical fibre and detect optical radiation which is Rayleigh backscattered from within said optical fibre; and
a processor configured to:
identify a first stimulus acting on at least one sensing portion of the optical fibre, wherein said first stimulus results in an effective optical path length change within said sensing portion of at least the wavelength of the optical radiation; and
determine the frequency of variation in backscatter intensity from said sensing portion in response to said first stimulus wherein the determined frequency of variation is used to provide an indication of the effective rate of change induced by said first stimulus on said sensing portion.

* * * * *